United States Patent
Li et al.

(10) Patent No.: US 11,646,856 B2
(45) Date of Patent: May 9, 2023

(54) TIMING CONFIGURATION METHOD AND APPARATUS

(71) Applicant: BEIJING XIAOMI MOBILE SOFTWARE CO., LTD., Beijing (CN)

(72) Inventors: Yanhua Li, Beijing (CN); Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/279,455

(22) PCT Filed: Oct. 19, 2018

(86) PCT No.: PCT/CN2018/111061
§ 371 (c)(1),
(2) Date: Mar. 24, 2021

(87) PCT Pub. No.: WO2020/077623
PCT Pub. Date: Apr. 23, 2020

(65) Prior Publication Data
US 2022/0069967 A1   Mar. 3, 2022

(51) Int. Cl.
*H04L 5/00* (2006.01)

(52) U.S. Cl.
CPC .......... *H04L 5/0098* (2013.01); *H04L 5/0082* (2013.01); *H04L 5/0094* (2013.01)

(58) Field of Classification Search
CPC .... H04L 5/0098; H04L 5/0082; H04L 5/0094
See application file for complete search history.

(56) References Cited

U.S. PATENT DOCUMENTS

| | | | | |
|---|---|---|---|---|
| 2019/0200396 | A1* | 6/2019 | Agiwal | H04W 74/0833 |
| 2020/0275485 | A1* | 8/2020 | Babaei | H04W 74/0808 |

FOREIGN PATENT DOCUMENTS

| | | | | |
|---|---|---|---|---|
| CN | 103378930 A | | 10/2013 | |
| CN | 108260214 A | | 7/2018 | |
| CN | 109802781 A | * | 5/2019 | ............... H04L 5/00 |
| CN | 110474735 A | * | 11/2019 | ........... H04L 1/1812 |
| CN | 110858958 A | * | 3/2020 | ........... H04L 5/0044 |
| WO | WO-2019130524 A1 | * | 7/2019 | ............. H04L 5/001 |

OTHER PUBLICATIONS

International Search Report of PCT/CN2018/111061 dated Jun. 28, 2019 with English translation, (4p).
Ericsson, "3GPP TSG-RAN WG2 #100 Tdoc R2-1713469" BWP Inactivity Timer and DRX, Dec. 1, 2017, (3p).

* cited by examiner

*Primary Examiner* — Saad A. Waqas
(74) *Attorney, Agent, or Firm* — Arch & Lake LLP

(57) ABSTRACT

A timing configuration method and apparatus, the method being used in a base station, the base station configuring at least one bandwidth part BWP for a terminal, and the method comprising: for a first BWP, configuring a corresponding first bandwidth part BWP inactivity timer (110); generating timer configuration information, the timer configuration information being used for indicating the use of the first BWP inactivity timer on the first BWP (120); and sending the timer configuration information to the terminal, so that the terminal uses the first BWP inactivity timer on the first BWP on the basis of the timer configuration information (130). The present method implements dynamic configuration of a BWP inactivity timer on each BWP, increasing the flexibility of timer configuration and reducing power consumption.

19 Claims, 9 Drawing Sheets

TIMING CONFIGURATION METHOD AND APPARATUS

CROSS-REFERENCE TO RELATED APPLICATIONS

This application is the US national phase application of International Application No. PCT/CN2018/110661, filed on Oct. 19, 2018, the entire contents of which are incorporated herein by reference for all purposes.

TECHNICAL FIELD

The present disclosure relates to a field of communication technology, and particularly to a method and an apparatus for timer configuration.

BACKGROUND

In a new generation of communication system, a carrier bandwidth may be divided into multiple Band Width Parts (BWPs). A terminal may be configured with multiple BWPs at the same time, but there may be only one activated downlink BWP and one activated uplink BWP in a serving cell at the same time. If the terminal is configured with a BWP inactivity timer, it means that automatic rollback from the currently activated BWP to the default BWP or the initial BWP is enabled. Sometimes, the BWP inactivity timer is generally in a fixed configuration. However, the BWP inactivity timer in the fixed configuration will cause low automatic BWP rollback efficiency. Therefore, it becomes particularly important how to improve the efficiency of BWP automatic rollback.

SUMMARY

According to a first aspect of the present disclosure, a method for timer configuration is provided. The method is applied to a base station. The base station configures at least one BWP for a terminal. The method includes: configuring a first BWP inactivity timer for a first BWP; generating timer configuration information, in which the timer configuration information is configured to indicate to use the first BWP inactivity timer on the first BWP; and sending the timer configuration information to the terminal, so that the terminal uses the first BWP inactivity timer on the first BWP according to the timer configuration information.

According to a second aspect of examples of the present disclosure, a method for timer configuration is provided. The method is applied to a terminal. A base station configures at least one BWP for the terminal. The method includes: receiving timer configuration information sent by the base station, in which the timer configuration information is configured to indicate to use a first BWP inactivity timer on a first BWP, and the first BWP inactivity timer is a BWP inactivity timer configured by the base station for the first BWP; and using the first BWP inactivity timer on the first BWP according to the timer configuration information.

According to a third aspect of examples of the present disclosure, a non-temporary computer readable storage medium with a computer program stored thereon is provided. The computer program is configured to execute the method for timer configuration provided in the first aspect above.

According to a fourth aspect of examples of the present disclosure, a non-temporary computer readable storage medium with a computer program stored thereon is provided. The computer program is configured to execute the method for timer configuration provided in the second aspect above.

According to a fifth aspect of examples of the present disclosure, an apparatus for timer configuration is provided. The apparatus is applied to a base station. The base station configures at least one BWP for a terminal. The apparatus includes: a processor; and a memory configured to store instructions executable by the processor. The processor is configured to: configure a first BWP inactivity timer for a first BWP; generate timer configuration information, in which the timer configuration information is configured to indicate to use the first BWP inactivity timer on the first BWP; and send the timer configuration information to the terminal, so that the terminal uses the first BWP inactivity timer on the first BWP according to the timer configuration information.

According to a sixth aspect of examples of the present disclosure, an apparatus for timer configuration is provided. The apparatus is applied to a terminal. A base station configures at least one BWP for the terminal. The apparatus includes: a processor; and a memory configured to store instructions executable by the processor. The processor is configured to: receive timer configuration information sent by the base station, in which the timer configuration information is configured to indicate to use a first BWP inactivity timer on a first BWP, and the first BWP inactivity timer is a BWP inactivity timer configured by the base station for the first BWP; and use the first BWP inactivity timer on the first BWP according to the timer configuration information.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show examples in conformity with examples of the present disclosure, and explain the principle of the present disclosure together with the specification.

DETAILED DESCRIPTION

The examples will be described in detail here, and examples thereof are shown in the accompanying drawings. When the following descriptions refer to the accompanying drawings, unless otherwise indicated, the same numbers in different drawings represent the same or similar elements. The implementations described in the following examples do not represent all the implementations consistent with the present disclosure. Rather, they are merely examples of the apparatus and method consistent with some aspects of the present disclosure.

The terms described in this disclosure are only for the purpose of describing specific examples and are not intended to restrict the present disclosure. The singular forms "a", "the" and "said" used in the disclosure and the appended claims are also intended to include plural forms, unless the context clearly indicates otherwise. It should also be understood that the term "and/or" used in the present disclosure means and includes any or all possible combinations of one or more associated items listed.

It should be understood that, although the terms first, second, third, etc. may be used in the present disclosure to describe various information, such information shall not be limited to these terms, which are only used to distinguish the same type of information. For example, without departing from the scope of this present disclosure, first information may also be referred to as second information, and similarly, and second information may also be referred to as first information. Depending on context, for example, the word "if" as used herein may be interpreted as "in a case that" or "when" or "in response to determining that".

Figure 1:
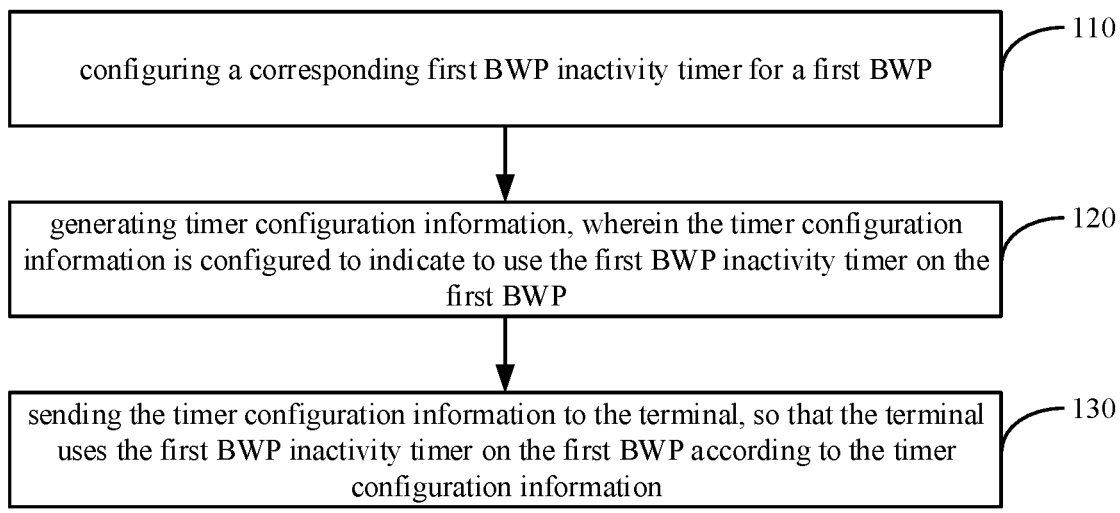
FIG. 1 is a flowchart illustrating a method for timer configuration according to an example.
Figure 2:
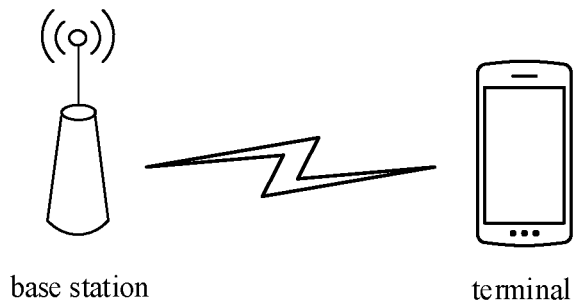
FIG. 2 is a schematic diagram illustrating an application scenario of a method for timer configuration according to an example.

FIG. 1 is a flowchart illustrating a method for timer configuration according to an example, and FIG. 2 is a schematic diagram illustrating an application scenario of a method for timer configuration according to an example. The method for timer configuration may be applied to a base station, and the base station configures at least one BWP for a terminal. As illustrated in FIG. 1, the method for timer configuration may include the following steps 110-130.

At step 110, a corresponding first BWP Inactivity timer is configured for a first BWP.

In examples of the present disclosure, in order to save power, the base station may dynamically configure a BWP inactivity timer used on each BWP for the terminal.

If a BWP inactivity timer is configured, it means that a function of automatic rollback function from a currently activated BWP to a default BWP or an initial BWP is enabled.

The function of automatic rollback to the default BWP or the initial BWP is specifically as follows. If the currently activated BWP is inactive for a period of time, the terminal will automatically roll back from the currently activated BWP to the default BWP after the BWP inactivity timer times out. If the default BWP is not configured, the terminal will automatically roll back to the initial BWP. The initial BWP is a BWP configured by the base station for the terminal through a system message, and the default BWP is a small BWP specifically configured for the terminal by the base station in consideration of power saving, so that PDCCH monitoring and/or PDSCH monitoring is conducted on such a small BWP to achieve power saving.

In an example, the first BWP in the above step 110 may be any BWP configured for the terminal by the base station.

In an example, the first BWP in the above step 110 may be a target BWP indicated by the base station to the terminal for BWP switch.

In an example, the first BWP in the above step 110 may be a default BWP and/or an initial BWP configured to implement a BWP automatic rollback function.

In an example, the first BWP inactivity timer in the above step 110 may correspond to service cells serving the terminal, and BWP inactivity timer configurations corresponding to different service cells are executed separately.

In an example, the service cells include a primary cell and a secondary cell for carrier aggregation (CA) or dual connection.

At step 120, timer configuration information is generated, in which the timer configuration information is configured to indicate to use the first BWP inactivity timer on the first BWP.

At step 130, the timer configuration information is sent to the terminal, so that the terminal uses the first BWP inactivity timer on the first BWP according to the timer configuration information.

In an example scenario, as shown in FIG. 2, a base station and a terminal are included. The base station may configure the corresponding first BWP inactivity timer for the first BWP and generate the timer configuration information. The timer configuration information is configured to indicate to use the first BWP inactivity timer on the first BWP. The base station send the timer configuration information to the terminal, so that the terminal may use the first BWP inactivity timer on the first BWP according to the timer configuration information.

As can be seen from the above example, by configuring the corresponding first BWP inactivity timer for the first BWP, generating the timer configuration information, in which the timer configuration information is configured to indicate to use the first BWP inactivity timer on the first BWP, and sending the timer configuration information to the terminal, the terminal may use the first BWP inactivity timer on the first BWP, thus achieving dynamic configuration of the BWP inactivity timer on each BWP, improving the flexibility of timer configuration and reducing power consumption.

Figure 3:
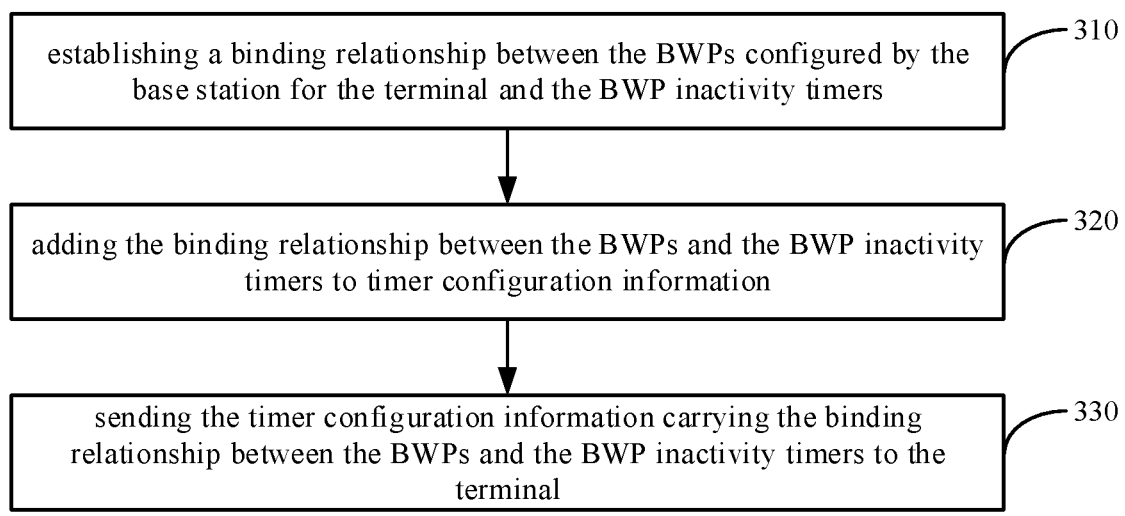
FIG. 3 is a flowchart illustrating another method for timer configuration according to an example.

FIG. 3 is a flowchart illustrating another method for timer configuration according to an example. The method for timer configuration may be applied to a base station and established on the basis of the method as shown in FIG. 1. The first BWP is any BWP configured by the base station for the terminal. As illustrated in FIG. 3, when executing step 130, it may include the following steps 310-330.

At step 310, a binding relationship between the BWPs configured by the base station for the terminal and the BWP inactivity timers is established.

In examples of the present disclosure, when configuring the BWP inactivity timer for the BWP, the base station may establish the binding relationship between the BWPs and the BWP inactivity timers, and inform the terminal of the binding relationship through the timer configuration information, so that the terminal rapidly obtains the binding relationship between the BWPs and the BWP inactivity timers from the timer configuration information received.

In an example, the binding relationship in the above step 310 may include a one-to-one correspondence relationship and/or a many-to-one correspondence relationship between the BWPs and the BWP inactivity timers.

For example, the BWP inactivity timer 1 is bound to BWP1, the BWP inactivity timer 2 is bound to BWP2, and the BWP inactivity timer 3 is bound to BWP3.

For another example, the BWPs bound to the BWP inactivity timer 1 include: BWP1, BWP2 and BWP3.

For another example, the BWP inactivity timer 1 is bound to BWP1; the BWPs bound to the BWP inactivity timer 2 include: BWP2 and BWP3.

At step 320, the binding relationship between the BWPs and the BWP inactivity timers is added to the timer configuration information.

At block 330, the timer configuration information carrying the binding relationship between the BWPs and the BWP inactivity timers is sent to the terminal.

As can be seen from the above examples, the binding relationship between the BWPs and the BWP inactivity timers configured by the base station for the terminal may be established and added to the timer configuration information, and the timer configuration information carrying the binding relationship between the BWPs and the BWP inactivity timers may be sent to the terminal. In this way, the terminal may determine a target BWP inactivity timer corresponding to the target BWP according to the binding relationship and use the target BWP inactivity timer on the target BWP, thus improving the accuracy of timer configuration.

Figure 4:
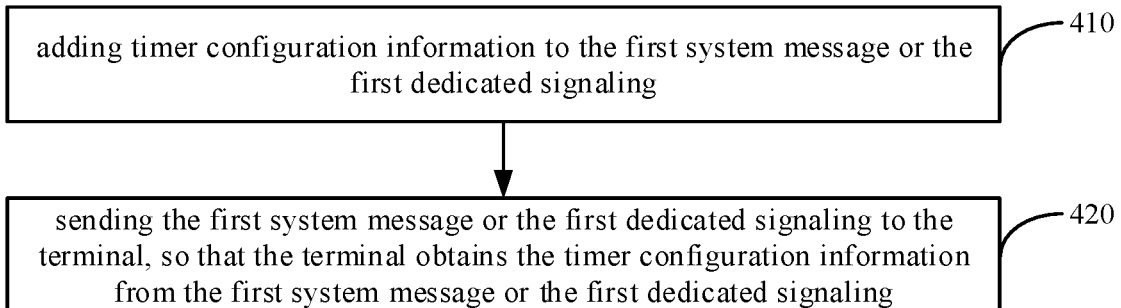
FIG. 4 is a flowchart illustrating another method for timer configuration according to an example.

FIG. 4 is a flowchart illustrating another method for timer configuration according to an example. The method for timer configuration may be applied to a base station and established on the basis of the method as shown in FIG. 3. As illustrated in FIG. 4, when executing step 330, it may include the following steps 410-420.

At step 410, the timer configuration information is added to a first system message or a first dedicated signaling.

At step 420, the first system message or the first dedicated signaling is sent to the terminal, so that the terminal obtains the timer configuration information from the first system message or the first dedicated signaling.

As can be seen from the above examples, the timer configuration information may be informed to the terminal through the first system message or the first dedicated signaling, thus improving the reliability of transmitting the timer configuration information.

Figure 5:
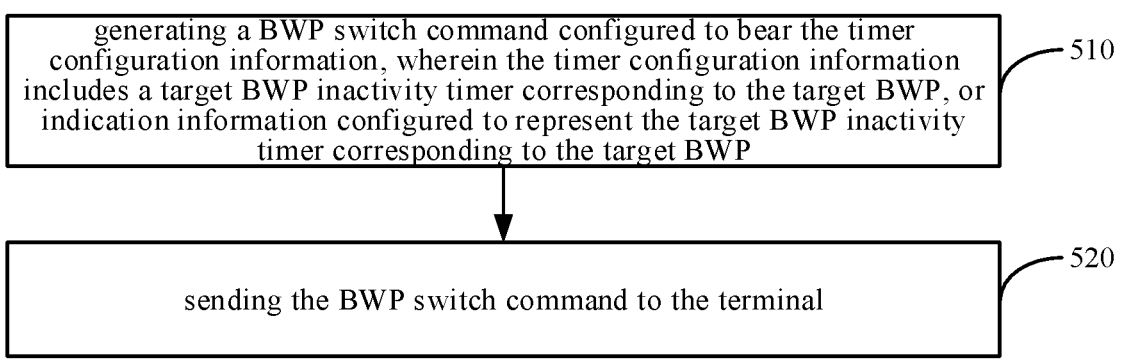
FIG. 5 is a flowchart illustrating another method for timer configuration according to an example.

FIG. 5 is a flowchart illustrating another method for timer configuration according to an example. The method for timer configuration may be applied to a base station and established on the basis of the method as shown in FIG. 1. The first BWP is a target BWP indicated by the base station to the terminal for BWP switch. As illustrated in FIG. 5, when executing step 130, it may include the following steps 510-520.

At block 510, a BWP switch command configured to bear the timer configuration information is generated, in which the timer configuration information includes a target BWP inactivity timer corresponding to the target BWP, or indication information configured to represent the target BWP inactivity timer corresponding to the target BWP.

In examples of the present disclosure, the BWP switch command is a command sent by the base station when there is a need to inform the terminal for BWP switch. When the BWP switch command includes the target BWP inactivity timer corresponding to the target BWP, the terminal also adjusts the BWP inactivity timer used on the target BWP as the target BWP inactivity timer included in the BWP switch command when switching to the target BWP.

At step 520, the BWP switch command is sent to the terminal.

As can be seen from the above example, the BWP switch command configured to bear the timer configuration information may be generated, in which the timer configuration information includes the target BWP inactivity timer corresponding to the target BWP or the indication information configured to represent the target BWP inactivity timer corresponding to the target BWP, and the BWP switch command may be sent to the terminal, so that the terminal may use the corresponding BWP inactivity timer on the target BWP when switching from the currently activated BWP to the target BWP, thus achieving dynamic adjustment of the BWP inactivity timer for BWP switch and improving the practicability of timer configuration.

Figure 6:
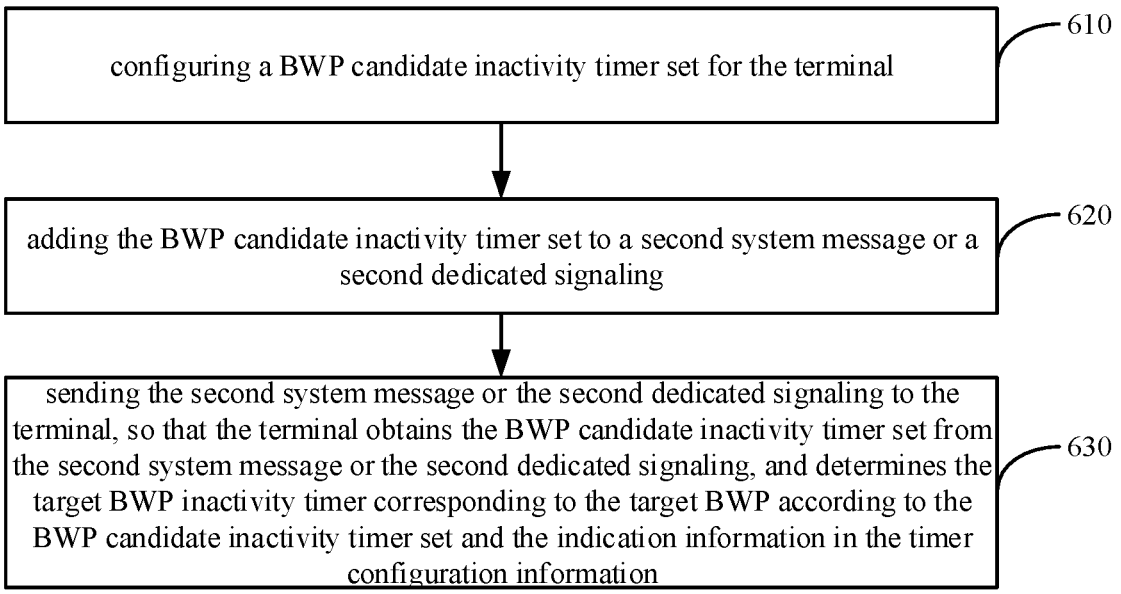
FIG. 6 is a flowchart illustrating another method for timer configuration according to an example.

FIG. 6 is a flowchart illustrating another method for timer configuration according to an example. The method for timer configuration may be applied to a base station and established on the basis of the method as shown in FIG. 5. As illustrated in FIG. 6, the method for timer configuration may further include the following steps 610-630.

At step 610, a BWP candidate inactivity timer set is configured for the terminal.

In examples of the present disclosure, the base station configures the BWP candidate inactivity timer set in advance according to the actual situation and inform the terminal of the BWP candidate inactivity timer set, so that it is convenient for the terminal to obtain the BWP inactivity timer from the BWP candidate inactivity timer set. For example, the timer configuration information includes the indication information configured to represent the target BWP inactivity timer corresponding to the target BWP (for example, the indication information is the second), so that the terminal may obtain the corresponding target BWP inactivity timer set from the BWP candidate inactivity timer according to the indication information (for example, obtain the second BWP candidate inactivity timer in the BWP candidate inactivity timer set as the target BWP inactivity timer).

At step 620, the BWP candidate inactivity timer set is added to a second system message or a second dedicated signaling.

At step 630, the second system message or the second dedicated signaling is sent to the terminal, so that the terminal obtains the BWP candidate inactivity timer set from the second system message or the second dedicated signaling, and determines the target BWP inactivity timer corresponding to the target BWP according to the BWP candidate inactivity timer set and the indication information in the timer configuration information.

As can be seen from the above example, the BWP candidate inactivity timer set may be configured for the terminal and informed to the terminal through the second system message or the second dedicated signaling, so that the terminal may accurately obtain the BWP inactivity timer from the BWP candidate inactivity timer set when determining the BWP inactivity timer corresponding to the indication information in the timer configuration information, thus improving the reliability of determining the BWP inactivity timer.

Figure 7:
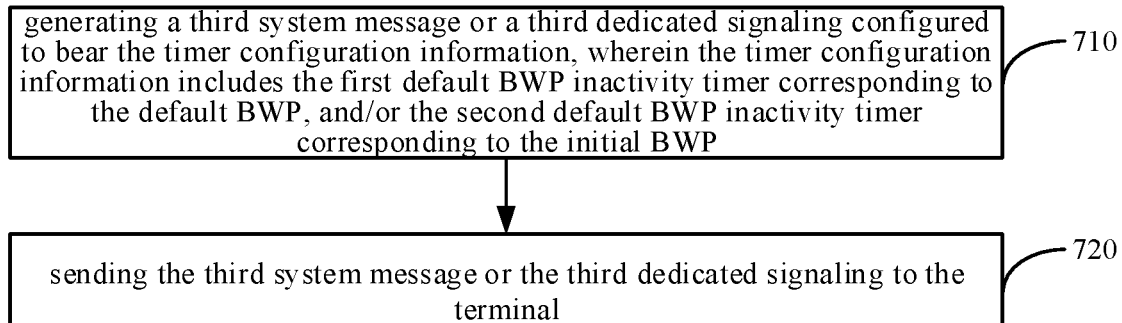
FIG. 7 is a flowchart illustrating another method for timer configuration according to an example.

FIG. 7 is a flowchart illustrating another method for timer configuration according to an example. The method for timer configuration may be applied to a base station and established on the basis of the method as shown in FIG. 1. The first BWP is the default BWP and/or the initial BWP configured to implement the BWP automatic rollback function. As illustrated in FIG. 7, when executing step 130, it may include the following steps 710-720.

At step 710, a third system message or a third dedicated signaling configured to bear the timer configuration information is generated, in which the timer configuration information includes a first default BWP inactivity timer corresponding to the default BWP, and/or a second default BWP inactivity timer corresponding to the initial BWP.

At block 720, the third system message or the third dedicated signaling is sent to the terminal.

As can be seen from the above example, the third system message or the third dedicated signaling configured to bear the timer configuration information may be generated, in which the timer configuration information includes the first default BWP inactivity timer corresponding to the default BWP and/or the second default BWP inactivity timer corresponding to the initial BWP, and the third system message or the third dedicated signaling may be sent to the terminal, so that the terminal may use the corresponding BWP inactivity timer on the default BWP or the initial BWP when switching from the currently activated BWP to the default BWP or the initial BWP, thus achieving the BWP inactivity timer adjustment configured to implement the BWP automatic rollback function, and improving the practicability of timer configuration.

Figure 8:
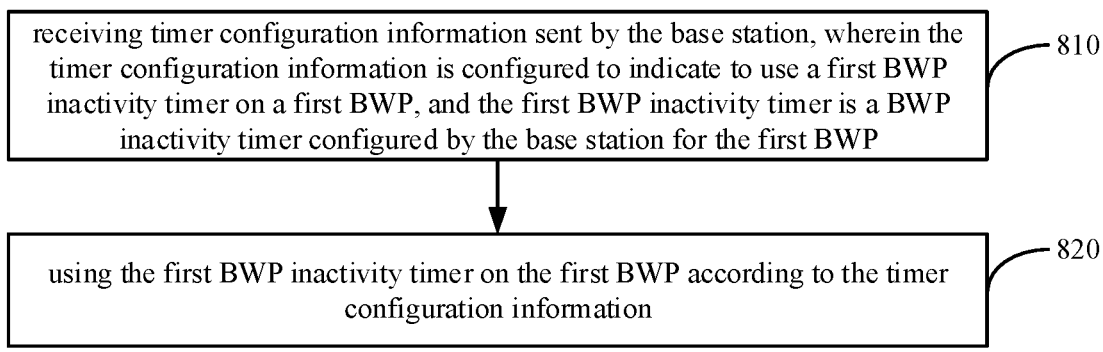
FIG. 8 is a flowchart illustrating a method for timer configuration according to an example.

FIG. 8 is a flowchart illustrating another method for timer configuration according to an example. The method for timer configuration may be applied to a terminal, and a base station configures at least one BWP for the terminal. As illustrated in FIG. 8, the method for timer configuration may include the following steps 810-820.

At step 810, timer configuration information sent by the base station is received, in which the timer configuration information is configured to indicate to use a first BWP inactivity timer on a first BWP, and the first BWP inactivity timer is a BWP inactivity timer configured by the base station for the first BWP.

At block 820, the first BWP inactivity timer is used on the first BWP according to the timer configuration information.

In examples of the present disclosure, in order to save power and prevent frequent switching between the currently activated BWP and the default BWP and/or the initial BWP, the terminal may dynamically adjust the BWP inactivity timer used on each BWP according to the configuration of the base station.

In an example, the first BWP is any BWP configured by the base station for the terminal, and the timer configuration information includes a binding relationship between the BWPs and the BWP inactivity timers configured by the base station for the terminal. When executing step 820, the following implementation may be adopted.

When switching from the currently activated BWP to a target BWP, a target BWP inactivity timer corresponding to the target BWP is determined according to the binding relationship, and the target BWP inactivity timer is used on the target BWP.

In an example, the binding relationship in the above implementation may include a one-to-one correspondence relationship and/or a many-to-one correspondence relationship between the BWPs and the BWP inactivity timers.

As can be seen form the above example, by receiving the timer configuration information sent by the base station, in which the timer configuration information is configured to indicate to use the first BWP inactivity timer on the first BWP, and the first BWP inactivity timer is the BWP inactivity timer configured by the base station for the first BWP, and using the first BWP inactivity timer on the first BWP according to timer configuration information, dynamic configuration of the first BWP inactivity timer used on the first BWP is achieved, the flexibility of BWP inactivity timer configuration is improved, and power consumption for listening to channel is reduced.

Figure 9:
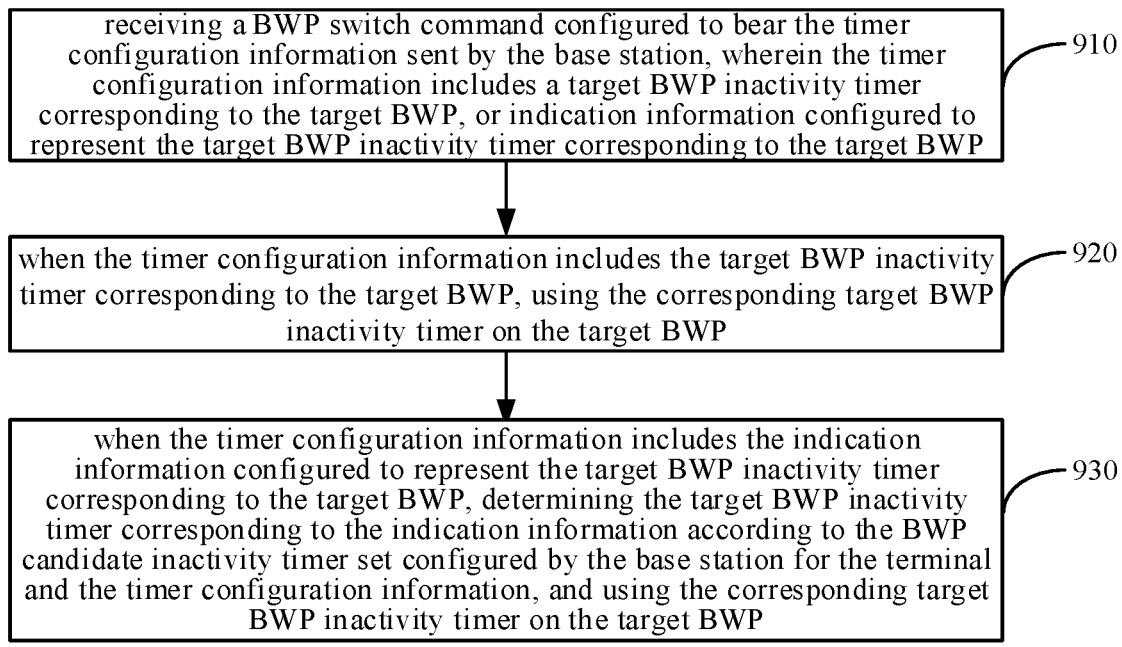
FIG. 9 is a flowchart illustrating another method for timer configuration according to an example.

FIG. 9 is a flowchart illustrating another method for timer configuration according to an example. The method for timer configuration may be applied to a terminal and established on the basis of the method as shown in FIG. 8. The first BWP is a target BWP indicated by the base station to the terminal for BWP switch. As illustrated in FIG. 9, when executing step 810, it may include the following step 910.

At step 910, a BWP switch command configured to bear the timer configuration information sent by the base station is received, in which the timer configuration information includes a target BWP inactivity timer corresponding to the target BWP, or indication information configured to represent the target BWP inactivity timer corresponding to the target BWP.

Accordingly, as illustrated in FIG. 9, when executing step 820, it may include the following steps 920-930.

At step 920, when the timer configuration information includes the target BWP inactivity timer corresponding to the target BWP, the corresponding target BWP inactivity timer is used on the target BWP;

At block 930, when the timer configuration information includes the indication information configured to represent the target BWP inactivity timer corresponding to the target BWP, the target BWP inactivity timer corresponding to the indication information is determined according to the BWP candidate inactivity timer set configured by the base station for the terminal and the timer configuration information, and the corresponding target BWP inactivity timer is used on the target BWP.

As can be seen from the above example, the terminal receives the BWP switch command configured to bear the timer configuration information sent by the base station. The timer configuration information includes the target BWP inactivity timer corresponding to the target BWP or the indication information configured to represent the target BWP inactivity timer corresponding to the target BWP. When the timer configuration information includes the target BWP inactivity timer corresponding to the target BWP, the terminal uses the corresponding target BWP inactivity timer on the target BWP. When the timer configuration information includes the indication information configured to represent the target BWP inactivity timer corresponding to the target BWP, the terminal determines the target BWP inactivity timer corresponding to the indication information according to the BWP candidate inactivity timer set configured by the base station for the terminal and the timer configuration information, and uses the corresponding target BWP inactivity timer on the target BWP. Thus, dynamic adjustment of the BWP inactivity timer for BWP switch is achieved and the practicability of BWP inactivity timer configuration is improved.

Figure 10:
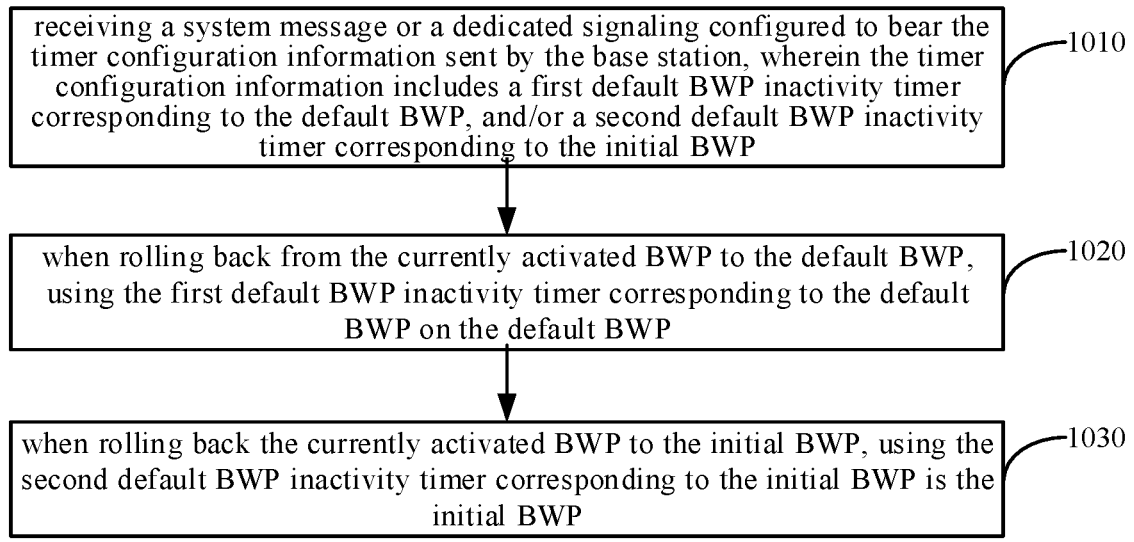
FIG. 10 is a flowchart illustrating another method for timer configuration according to an example.

FIG. 10 is a flowchart illustrating another method for timer configuration according to an example. The method for timer configuration may be applied to a terminal and established on the basis of the method as shown in FIG. 8. The first BWP is the default BWP and/or the initial BWP configured to implement the BWP automatic rollback function. As illustrated in FIG. 9, when executing step 810, it may include the following step 1010.

At step 1010, a system message or a dedicated signaling configured to bear the timer configuration information sent by the base station is received, in which the timer configuration information includes a first default BWP inactivity timer corresponding to the default BWP, and/or a second default BWP inactivity timer corresponding to the initial BWP.

Accordingly, as illustrated in FIG. 10, when executing step 820, it may include the following steps 1020-1030.

At step 1020, when rolling back from the currently activated BWP to the default BWP, the first default BWP inactivity timer corresponding to the default BWP is used on the default BWP.

At step 1030, when rolling back from the currently activated BWP to the initial BWP, the second default BWP inactivity timer corresponding to the initial BWP is used on the initial BWP.

As can be seen from the above example, the system message or the dedicated signaling configured to bear the timer configuration information sent by the base station is received. The timer configuration information includes the first default BWP inactivity timer corresponding to the default BWP and/or the second default BWP inactivity timer corresponding to the initial BWP. When rolling back from the currently activated BWP to the default BWP, the first default BWP inactivity timer corresponding to the default BWP is used on the default BWP; when rolling back from the currently activated BWP to the initial BWP, the second default BWP inactivity timer corresponding to the initial BWP is used on the initial BWP, thus achieving the BWP inactivity timer adjustment configured to implement the BWP automatic rollback function, and improving the practicability of BWP inactivity timer configuration.

The present disclosure further provides examples of the apparatus for time adjustment corresponding to the aforementioned examples of the method for timer configuration. Furthermore, for the parts not specified in examples of the apparatus for timer configuration, reference may be made to the examples of the corresponding method for timer configuration.

Figure 11:
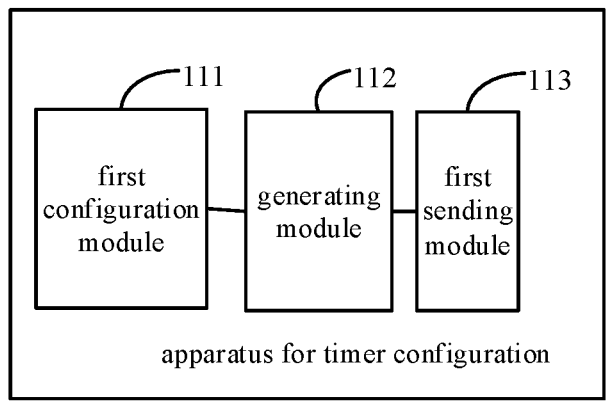
FIG. 11 is a block diagram illustrating an apparatus for timer configuration according to an example.

FIG. 11 is a block diagram illustrating an apparatus for timer configuration according to an example. The apparatus is applied to a base station, and the base station configures at least one BWP for a terminal. The apparatus is configured to implement the method for timer configuration as shown in FIG. 1. As illustrated in FIG. 11, the apparatus for timer configuration may include a first configuration module 111, a generating module 112 and a first sending module 113.

The first configuration module 111 is configured to configure a corresponding first BWP inactivity timer for a first BWP.

The generating module 112 is configured to generate timer configuration information, in which the timer configuration information is configured to indicate to use the first BWP inactivity timer on the first BWP.

The first sending module 113 is configured to send the timer configuration information to the terminal, so that the terminal uses the first BWP inactivity timer on the first BWP according to the timer configuration information.

As can be seen from the above example, by configuring the first BWP inactivity timer corresponding to the first BWP, generating the timer configuration information, in which the timer configuration information is configured to indicate to use the first BWP inactivity timer on the first BWP, and sending the timer configuration information to the terminal, the terminal may use the first BWP inactivity timer on the first BWP according to the timer configuration information, thus achieving dynamic configuration of the BWP inactivity timer on each BWP, improving the flexibility of timer configuration and reducing power consumption.

Figure 12:
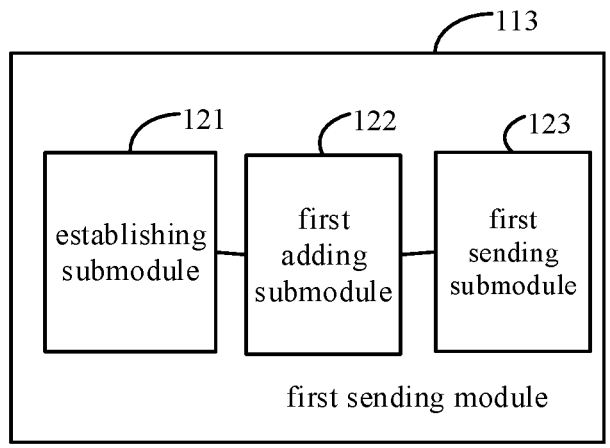
FIG. 12 is a block diagram illustrating another apparatus for timer configuration according to an example.

In an example, on the basis of the apparatus as shown in FIG. 11, as illustrated in FIG. 12, the first BWP is any BWP configured by the base station for the terminal, and the first sending module 113 may include an establishing submodule 121, a first adding submodule 122 and a first sending submodule 123.

The establishing submodule 121 is configured to establish a binding relationship between the BWPs configured by the base station for the terminal and the BWP inactivity timers.

The first adding submodule 122 is configured to add the binding relationship to the timer configuration information.

The first sending submodule 123 is configured to send the timer configuration information carrying the binding relationship to the terminal.

As can be seen from the above examples, the binding relationship between the BWPs configured by the base station for the terminal and the BWP inactivity timers may be established and added in the timer configuration information, and the timer configuration information carrying the binding relationship between the BWPs and the BWP inactivity timers may be sent to the terminal, so that the terminal may determine a target BWP inactivity timer corresponding to the target BWP according to the binding relationship and use the target BWP inactivity timer on the target BWP, thus improving the accuracy of timer configuration.

In an example, on the basis of the apparatus as shown in FIG. 12, the binding relationship includes a one-to-one correspondence relationship and/or a many-to-one correspondence relationship between the BWPs and the BWP inactivity timers.

Figure 13:
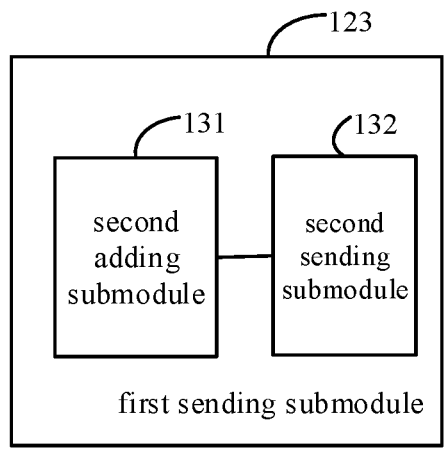
FIG. 13 is a block diagram illustrating another apparatus for timer configuration according to an example.

In an example, on the basis of the apparatus as shown in FIG. 12, as illustrated in FIG. 13, the first sending submodule 123 may include a second adding submodule 131 and a second sending submodule 132.

The second adding submodule 131 is configured to add the timer configuration information to a first system message or a first dedicated signaling.

The second sending submodule 132 is configured to send the first system message or the first dedicated signaling to the terminal, so that the terminal obtains the timer configuration information from the first system message or the first dedicated signaling.

As can be seen from the above examples, the timer configuration information may be informed to the terminal through the first system message or the first dedicated signaling, thus improving the reliability of transmitting the timer configuration information.

Figure 14:
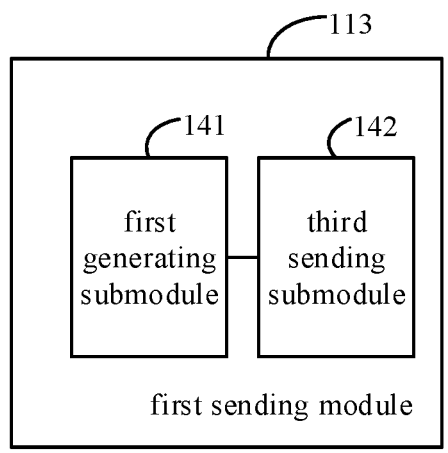
FIG. 14 is a block diagram illustrating another apparatus for timer configuration according to an example.

In an example, on the basis of the apparatus as shown in FIG. 11, as illustrated in FIG. 14, the first BWP is the target BWP indicated by the base station to the terminal for BWP switch, and the first sending module 113 may include a first generating submodule 141, and a third sending submodule 142.

The first generating submodule 141 is configured to generate a BWP switch command configured to bear the timer configuration information, in which the timer configuration information includes a target BWP inactivity timer corresponding to the target BWP, or indication information configured to represent the target BWP inactivity timer corresponding to the target BWP.

The third sending submodule 142 is configured to send the BWP switch command to the terminal.

As can be seen from the above example, the BWP switch command configured to bear the timer configuration information may be generated, in which the timer configuration information includes the target BWP inactivity timer corresponding to the target BWP or the indication information configured to represent the target BWP inactivity timer corresponding to the target BWP, and the BWP switch command may be sent to the terminal, so that the terminal may use the corresponding BWP inactivity timer on the target BWP when switching from the currently activated BWP to the target BWP, thus achieving dynamic adjustment of the BWP inactivity timer for BWP switch and improving the practicability of timer configuration.

Figure 15:
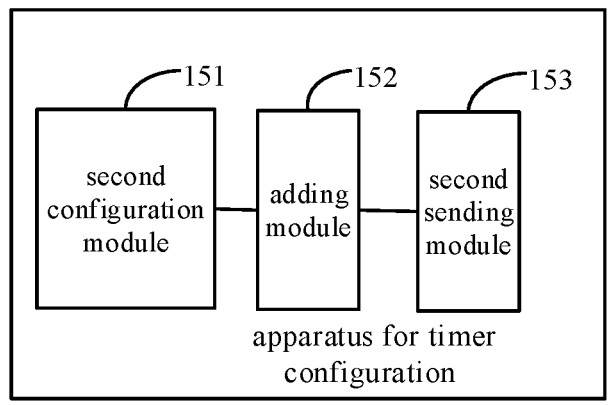
FIG. 15 is a block diagram illustrating another apparatus for timer configuration according to an example.

In an example, on the basis of the apparatus as shown in FIG. 14, as illustrated in FIG. 15, the apparatus may further include a second configuration module 151, an adding module 152 and a second sending module 153.

The second configuration module 151 is configured to configure a BWP candidate inactivity timer set for the terminal.

The adding module 152 is configured to add the BWP candidate inactivity timer set to a second system message or a second dedicated signaling.

The second sending module 153 is configured to send the second system message or the second dedicated signaling to the terminal, so that the terminal obtains the BWP candidate timer set from the second system message or the second dedicated signaling, and determines the target BWP inactivity timer corresponding to the target BWP according to the BWP candidate inactivity timer set and the indication information in the timer configuration information.

As can be seen from the above example, the BWP candidate inactivity timer set may be configured for the terminal and informed to the terminal through the second system message or the second dedicated signaling, so that the terminal may accurately obtain the BWP inactivity timer from the BWP candidate inactivity timer set when determining the BWP inactivity timer corresponding to the indication information in the timer configuration information, thus improving the reliability of determining the BWP inactivity timer.

Figure 16:
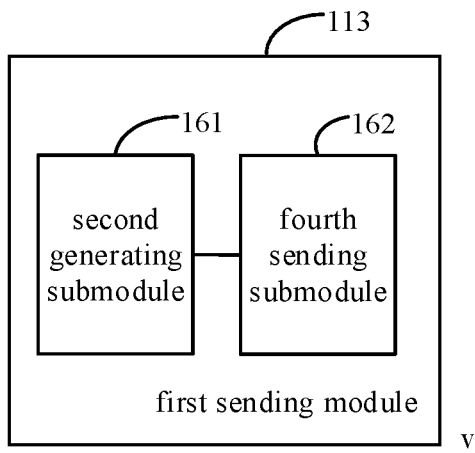
FIG. 16 is a block diagram illustrating another apparatus for timer configuration according to an example.

In an example, on the basis of the apparatus as shown in FIG. 11, as illustrated in FIG. 16, the first BWP is the default BWP and/or the initial BWP configured to implement a BWP automatic rollback function, and the first sending module 113 may include a second generating submodule 161 and a fourth sending submodule 162.

The second generating submodule 161 is configured to generate a third system message or a third dedicated signaling configured to bear the timer configuration information, in which the timer configuration information includes a default BWP inactivity timer corresponding to the default BWP, and/or an initial BWP inactivity timer corresponding to the initial BWP.

The fourth sending submodule 162 is configured to send the third system message or the third dedicated signaling to the terminal.

As can be seen from the above example, the third system message or the third dedicated signaling configured to bear the timer configuration information may be generated, in which the timer configuration information includes the first default BWP inactivity timer corresponding to the default BWP and/or the second default BWP inactivity timer corresponding to the initial BWP, and the third system message or the third dedicated signaling may be sent to a terminal, so that the terminal may use the corresponding BWP inactivity timer on the default BWP or the initial BWP when switching from the currently activated BWP to the default BWP or the initial BWP, thus achieving the BWP inactivity timer adjustment configured to implement the BWP automatic rollback function and improving the practicability of timer configuration.

In an example, on the basis of the apparatus as shown in FIG. 11, the first BWP inactivity timer corresponds to service cells serving the terminal, and the BWP inactivity timer configurations corresponding to different service cells are executed separately. In an example, the service cells include a primary cell and a secondary cell for carrier aggregation (CA) or dual connection.

Figure 17:
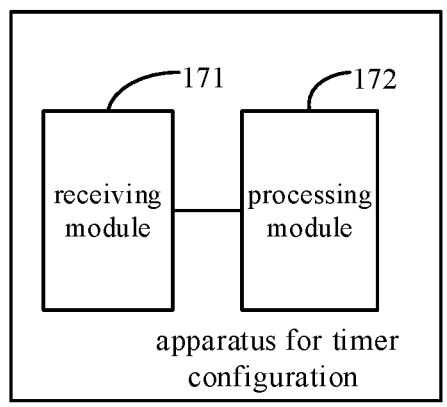
FIG. 17 is a block diagram illustrating an apparatus for timer configuration according to an example.

FIG. 17 is a block diagram illustrating an apparatus for timer configuration according to an example. The apparatus is applied to a terminal, and a base station configures at least one BWP for the terminal. The apparatus is configured to implement the method for timer configuration as shown in FIG. 8. As illustrated in FIG. 17, the apparatus for timer configuration may include a receiving module 171 and a processing module 172.

The receiving module 171 is configured to receive timer configuration information sent by the base station, in which the timer configuration information is configured to indicate to use a first BWP inactivity timer on a first BWP, and the first BWP inactivity timer is a BWP inactivity timer configured by the base station for the first BWP.

The processing module 172 is configured to use the first BWP inactivity timer on the first BWP according to the timer configuration information.

As can be seen form the above example, by receiving the timer configuration information sent by the base station, in which the timer configuration information is configured to indicate to use the first BWP inactivity timer on the first BWP, and the first BWP inactivity timer is the BWP inactivity timer configured by the base station for the first BWP, and using the first BWP inactivity timer on the first BWP according to timer configuration information, dynamic configuration of the first BWP inactivity timer used on the first BWP is achieved, the flexibility of BWP inactivity timer configuration is improved, and power consumption for channel monitoring is reduced.

Figure 18:
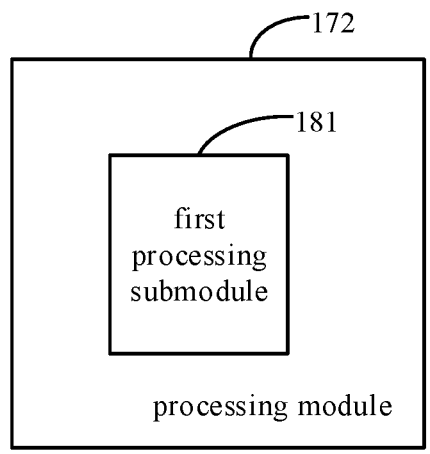
FIG. 18 is a block diagram illustrating another apparatus for timer configuration according to an example.

In an example, on the basis of the apparatus as shown in FIG. 17, as illustrated in FIG. 18, the first BWP is any BWP configured by the base station for the terminal, and the timer configuration information includes a binding relationship between the BWPs configured by the base station for the terminal and the BWP inactivity timers, and the processing module 172 may include a first processing submodule 181.

The first processing submodule 181 is configured to determine a target BWP inactivity timer corresponding to a target BWP according to a binding relationship and use the target BWP inactivity timer on the target BWP when switching from a currently activated BWP to the target BWP.

In an example, on the basis of the apparatus as shown in FIG. 18, the binding relationship includes a one-to-one correspondence relationship and/or a many-to-one correspondence relationship between the BWPs and the BWP inactivity timers.

Figure 19:
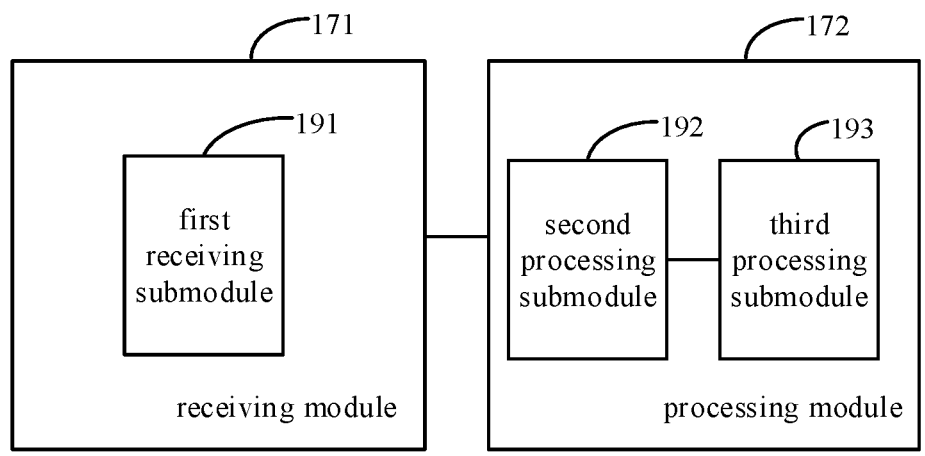
FIG. 19 is a block diagram illustrating another apparatus for timer configuration according to an example.

In an example, on the basis of the apparatus as shown in FIG. 17, as illustrated in FIG. 19, the first BWP is a target BWP indicated by the base station to the terminal for BWP switch, the receiving module 171 may include a first receiving submodule 191, and the processing module 172 may include a first processing submodule 192 and a second processing submodule 193.

The first receiving submodule 191 is configured to receive a BWP switch command configured to bear the timer configuration information sent by the base station, in which the timer configuration information includes a target BWP inactivity timer corresponding to the target BWP, or indication information configured to represent the target BWP inactivity timer corresponding to the target BWP.

The first processing submodule 192 is configured to, when the timer configuration information includes the target BWP inactivity timer corresponding to the target BWP, use the target BWP inactivity timer on the target BWP.

The second processing submodule 193 is configured to, when the timer configuration information includes the indication information configured to represent the target BWP inactivity timer corresponding to the target BWP, determine the target BWP inactivity timer corresponding to the indication information according to the BWP candidate inactivity timer set configured by the base station for the terminal and the timer configuration information, and use the target BWP inactivity timer on the target BWP.

As can be seen from the above example, after receiving the BWP switch command configured to bear the timer configuration information sent by the base station, in which the timer configuration information includes the target BWP inactivity timer corresponding to the target BWP or the indication information configured to represent the target BWP inactivity timer corresponding to the target BWP, when the timer configuration information includes the target BWP inactivity timer corresponding to the target BWP, the corresponding target BWP inactivity timer is used on the target BWP, and when the timer configuration information includes the indication information configured to represent the target BWP inactivity timer corresponding to the target BWP, the target BWP inactivity timer corresponding to the indication information is determined according to the BWP candidate inactivity timer set configured by the base station for the terminal and the timer configuration information, and the corresponding BWP inactivity timer is used on the target BWP, thus achieving adjustment of the BWP inactivity timer for BWP switch and improving the practicability of BWP inactivity timer configuration.

Figure 20:
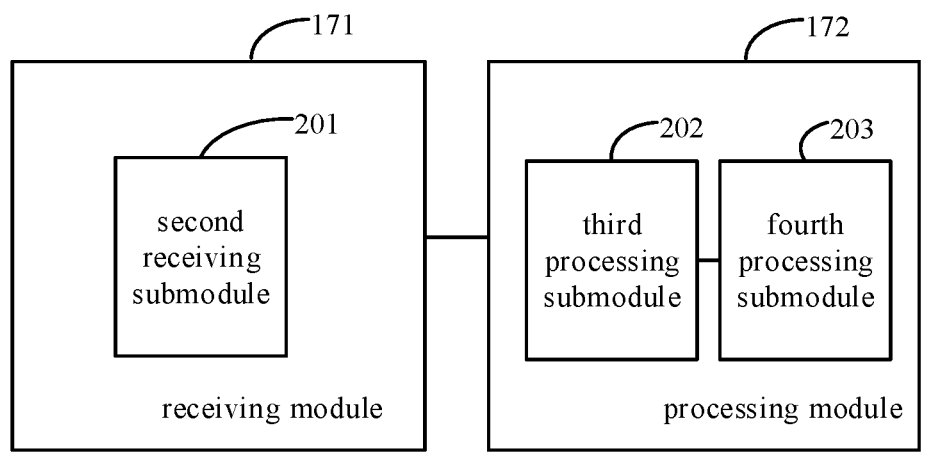
FIG. 20 is a block diagram illustrating another apparatus for timer configuration according to an example.

In an example, on the basis of the apparatus as shown in FIG. 17, as illustrated in FIG. 20, the first BWP is the default BWP or the initial BWP configured to implement the BWP automatic rollback function, the receiving module 171 may include a second receiving submodule 201, and the processing module 172 may include a third processing submodule 202 and a fourth processing submodule 203.

The second receiving submodule 201 is configured to receive a system message or a dedicated signaling configured to bear the timer configuration information sent by the terminal, in which the timer configuration information includes a first default BWP inactivity timer corresponding to the default BWP, and/or a second default BWP inactivity timer corresponding to the initial BWP.

The third processing submodule 202 is configured to, when rolling back from the currently activated BWP to the default BWP, use the first default BWP inactivity timer corresponding to the default BWP on the default BWP.

The fourth processing submodule 203 is configured to, when rolling back from the currently activated BWP to the initial BWP, use the second default BWP inactivity timer corresponding to the initial BWP on the initial BWP.

As can be seen from the above example, the system message or the dedicated signaling configured to bear the timer configuration information sent by the base station is received. The timer configuration information includes the first default BWP inactivity timer corresponding to the default BWP and/or the second default BWP inactivity timer corresponding to the initial BWP. When rolling back from the currently activated BWP to the default BWP, the first default BWP inactivity timer corresponding to the default BWP is used on the default BWP; when rolling back from the currently activated BWP to the initial BWP, the second default BWP inactivity timer corresponding to the initial BWP is used on the initial BWP, thus achieving BWP inactivity timer adjustment configured to implement the BWP automatic rollback function and improving the practicability of BWP inactivity timer configuration.

The examples of the apparatus are basically corresponding to the examples of the method. Thus, for the relevant part, please refer to description of the examples of the method. The examples of the apparatus described above are only schematic, wherein the above units described as separate parts may or may not be physically separated, the parts shown as units may or may not be physical units, which may be located in one place, or may be distributed to multiple network units. Some or all modules may be selected according to the actual requirements to achieve the purpose of this disclosure. Ordinary technicians in the field could understand and implement it without any creative effort.

Accordingly, a non-temporary computer readable storage medium with a computer program stored thereon is provided in the present disclosure. The computer program is configured to implement the method for timer configuration in any of the above FIGS. 1-7.

Accordingly, a non-temporary computer readable storage medium with a computer program stored thereon is provided in the present disclosure. The computer program is configured to implement the method for timer configuration in any of the above FIGS. 8-10.

Accordingly, an apparatus for timer configuration is further provided in the present disclosure. The apparatus is applied to a base station, and the base station configures at least one BWP for a terminal. The apparatus includes: a processor; and a memory configured to store instructions executable by the processor. The processor is configured to: configure a corresponding first BWP inactivity timer for a first BWP; generate timer configuration information, in which the timer configuration information is configured to indicate to use the first BWP inactivity timer on the first BWP; and send the timer configuration information to the terminal, so that the terminal uses the first BWP inactivity timer on the first BWP according to the timer configuration information.

Figure 21:
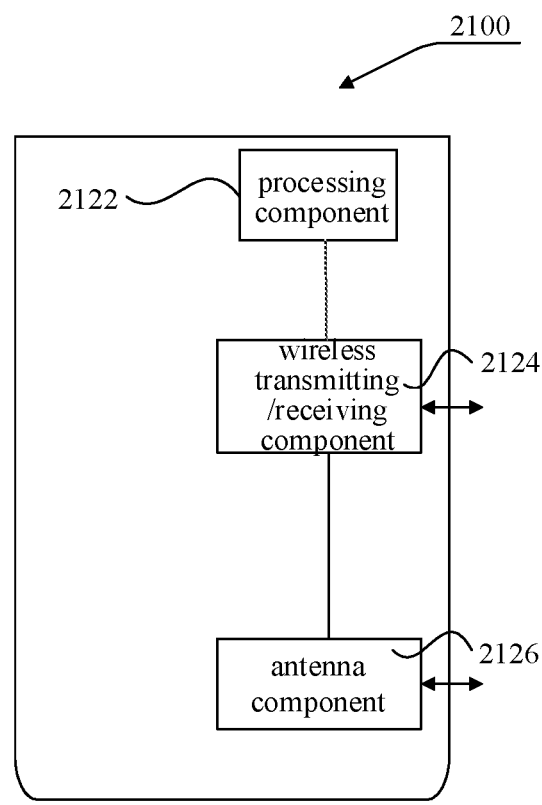
FIG. 21 is a schematic diagram illustrating an apparatus for timer configuration according to an example.

FIG. 21 is a schematic diagram illustrating a structure of an apparatus for timer configuration according to an example. The apparatus 2100 may be provided as a base station. Referring to FIG. 21, the apparatus 2100 includes a processing component 2122, a wireless transmitting/receiving component 2124, an antenna component 2126, and a signal processing part specific to a wireless interface. The processing component 2122 may further include one or more processors.

One processor of the processing component 2122 may be configured to implement any of the above methods for timer configuration.

Accordingly, an apparatus for timer configuration is further provided in the present disclosure. The apparatus is applied to a terminal, and a base station configures at least one BWP for the terminal. The apparatus includes: a processor; and a memory configured to store instructions executable by the processor. The processor is configured to: receive timer configuration information sent by the base station, in which the timer configuration information is configured to indicate to use a first BWP inactivity timer on a first BWP, and the first BWP inactivity timer is a BWP inactivity timer configured by the base station for the first BWP; and use the first BWP inactivity timer on the first BWP according to the timer configuration information.

Figure 22:
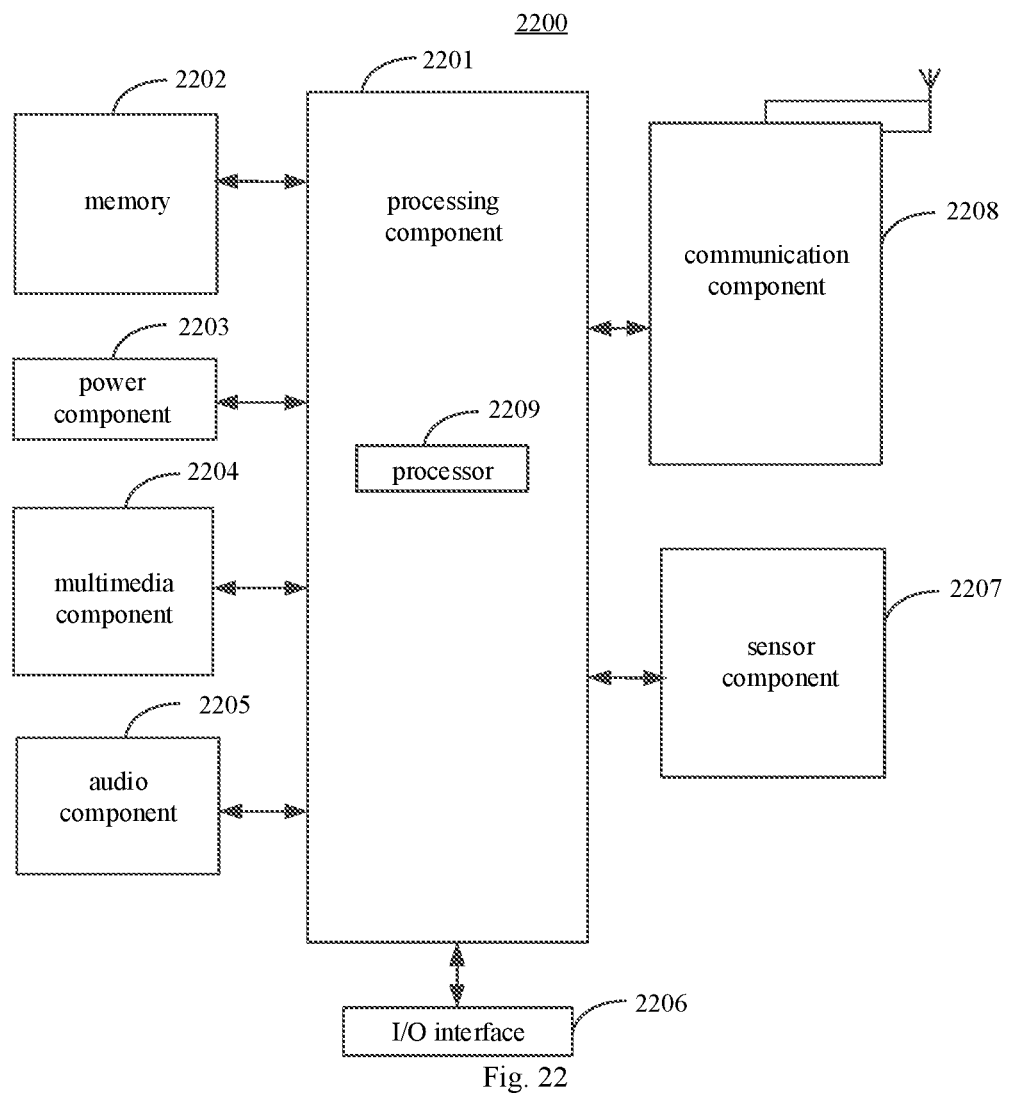
FIG. 22 is a schematic diagram illustrating an apparatus for timer configuration according to an example.

FIG. 22 is a schematic diagram illustrating an apparatus for timer configuration according to an example. As illustrated in FIG. 22, an apparatus 2200 for timer configuration according to an example is shown. The apparatus 2200 may be a mobile phone, a computer, a digital broadcasting device, a messaging transceiver, a game console, a tablet device, a medical equipment, a fitness equipment, a personal digital assistant, etc.

Referring to FIG. 22, the apparatus 2200 may include one or more of the following components: a processing component 2201, a memory 2202, a power component 2203, a multimedia component 2204, an audio component 2205, an input/output (I/O) interface 2206, a sensor component 2207, and a communication component 2208.

The processing component 2201 generally controls the whole operation of the apparatus 2200, such as the operations related to display, phone call, data communication, camera operation and recording operation. The processing component 2201 may include one or more processors 2209 to perform instructions, to complete all or part of steps in the above methods. In addition, the processing component 2201 may include one or more modules which facilitate interaction between the processing component 2201 and other components. For example, the processing component 2201 may include a multimedia module to facilitate interaction between the multimedia component 2204 and the processing component 2201.

The memory 2202 is configured to store various types of data to support the operation of the apparatus 2200. Examples of the data include instructions of any applications or methods operated on the apparatus 2200, contact data, phonebook data, messages, pictures, videos, etc. The memory 2202 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 2203 provides power for various components of the apparatus 2200. The power component 2203 may include a power management system, one or more power supplies, and other components related to generation, management and distribution of power in the apparatus 2200.

The multimedia component 2204 includes a screen providing an output interface between the apparatus 2200 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a duration and a pressure related to the touch or swipe operation. In some examples, the multimedia component 2204 include a front camera and/or a rear camera. When the apparatus 2200 is in operation mode, such as a photographing mode or a video mode, the front camera and/or the rear camera may receive an external multimedia data. Each of the front camera and the rear camera may be a fixed optical lens system or have focus and optical zoom capability.

The audio component 2205 is configured to output and/or input an audio signal. For example, the audio component 2205 includes a microphone (MIC) configured to receive an external audio signal when the apparatus 1900 is in an operation mode, such as a call mode, a recording mode, and a voice recognition mode. The audio signal received may be further stored in the memory 2202 or sent via the communication component 2208. In some examples, the audio component 2205 further includes a speaker configured to output audio signals.

The I/O interface 2206 provides an interface between the processing component 2201 and the peripheral interface modules, such as a keyboard, a click wheel, a button, etc. The buttons may include but not limited to a home button, a volume button, a start button and a lock button.

The sensor component 2207 includes one or more sensors to provide status assessments of various aspects of the apparatus 2200. For example, the sensor component 2207 may detect an on/off state of the apparatus 2200, relative positioning of components (e.g., the display and the keypad) of the apparatus 2200, a change in position of the apparatus 2200 or a component of the apparatus 2200, a presence or absence of user contact with the apparatus 2200, an orientation or an acceleration/deceleration of the apparatus 2200, and a change in temperature of the apparatus 2200. The sensor component 2207 may include a proximity sensor configured to detect the presence of nearby objects without any physical contact. The sensor component 2207 may also include a light sensor, such as a CMOS or CCD image sensor, for use in imaging applications. In some examples, the sensor component 2207 may also include an accelerometer sensor, a gyroscope sensor, a magnetic sensor, a pressure sensor, or a temperature sensor.

The communication component 2208 is configured to facilitate wired or wireless communication between the apparatus 2200 and other apparatus. The apparatus 2200 can access a wireless network based on a communication standard, such as WiFi, 2G, or 3G, or a combination thereof. In one example, the communication component 1908 receives a broadcast signal or broadcast associated information from an external broadcast management system via a broadcast channel. In one example, the communication component 1908 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example, the apparatus 2200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an example, there is also provided a non-temporary computer readable storage medium including instructions, such as the memory 2202 including instructions, and the instructions are executable by the processor 2209 of the apparatus 2200, for performing the above-described methods. For example, the non-transitory computer-readable storage medium may be a ROM, a RAM (random access memory), a CD-ROM, a magnetic tape, a floppy disc, an optical data storage device, and the like.

When the instructions in the storage medium are executed by the processor, the apparatus 2200 may execute any of the above methods for timer configuration.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only. It will be appreciated that the present disclosure is not limited to the exact construction that has been described above and illustrated in the accompanying drawings, and that various modifications and changes can be made without departing from the scope thereof.

It will be appreciated that the present disclosure is not limited to the exact construction that has been described above and illustrated in the accompanying drawings, and that various modifications and changes can be made without departing from the scope thereof.

What is claimed is:

1. A method for timer configuration, that is performed by a base station, wherein the base station configures at least one Band Width Part (BWP) for a terminal, the method comprising:

configuring a corresponding first BWP inactivity timer for a first BWP;

generating timer configuration information, wherein the timer configuration information is configured to indicate to use the first BWP inactivity timer on the first BWP; and sending the timer configuration information to the terminal, so that the terminal uses the first BWP inactivity timer on the first BWP according to the timer configuration information;

wherein the method further comprises:

configuring a BWP candidate inactivity timer set for the terminal, wherein the BWP candidate inactivity timer set comprises at least two BWP candidate inactivity timers configured respectively for BWPs;

adding the BWP candidate inactivity timer set to a second system message or a second dedicated signaling; and sending the second system message or the second dedicated signaling to the terminal, so that the terminal obtains the BWP candidate inactivity timer set from the second system message or the second dedicated signaling, and determines a target BWP inactivity timer corresponding to a target BWP according to the BWP candidate inactivity timer set and indication information in the timer configuration information;

wherein the timer configuration information further comprises a binding one-to-one correspondence relationship between the BWPs configured by the base station for the terminal and the at least two BWP candidate inactivity timers; and wherein different BWP candidate inactivity timer configurations corresponding to different service cells are executed separately.

2. The method of claim 1, wherein the first BWP is any BWP configured by the base station for the terminal;

sending the timer configuration information to the terminal comprises:

establishing a binding relationship between the BWPs configured by the base station for the terminal and the BWP inactivity timers; and adding the binding relationship to the timer configuration information, and sending the timer configuration information carrying the binding relationship to the terminal.

3. The method of claim 2, wherein the binding relationship comprises a one-to-one correspondence relationship and/or a many-to-one correspondence relationship between the BWPs and the BWP inactivity timers.

4. The method of claim 2, wherein said sending the timer configuration information carrying the binding relationship to the terminal comprises:

adding the timer configuration information to a first system message or a first dedicated signaling; and sending the first system message or the first dedicated signaling to the terminal, so that the terminal obtains the timer configuration information from the first system message or the first dedicated signaling.

5. The method of claim 1, wherein the first BWP is a default BWP and/or an initial BWP configured to implement a BWP automatic rollback function;

said sending the timer configuration information to the terminal comprises:

generating a third system message or a third dedicated signaling configured to bear the timer configuration information, wherein the timer configuration information comprises a first default BWP inactivity timer corresponding to the default BWP, and/or a second default BWP inactivity timer corresponding to the initial BWP; and sending the third system message or the third dedicated signaling to the terminal.

6. The method of claim 1, wherein the first BWP corresponds to service cells serving the terminal, and BWP inactivity timer configurations corresponding to different service cells are executed separately.

7. The method of claim 6, wherein the service cells comprise a primary cell and a secondary cell for carrier aggregation (CA) or dual connection.

8. The method of claim 1, wherein the first BWP is the target BWP indicated by the base station to the terminal for BWP switch; and
wherein sending the timer configuration information to the terminal comprises:
generating a BWP switch command configured to bear the timer configuration information, wherein the timer configuration information includes the target BWP inactivity timer corresponding to the target BWP, or indication information configured to represent the target BWP inactivity timer corresponding to the target BWP; and
sending the BWP switch command to the terminal.

9. A method for timer configuration, that is performed by a terminal, wherein a base station configures at least one Band Width Part (BWP) for the terminal, the method comprising:
receiving timer configuration information sent by the base station, wherein the timer configuration information is configured to indicate to use a first BWP inactivity timer on a first BWP, and the first BWP inactivity timer is a BWP inactivity timer configured by the base station for the first BWP; and
using the first BWP inactivity timer on the first BWP according to the timer configuration information;
wherein using the first BWP inactivity timer on the first BWP according to the timer configuration information comprises:
in response to determining that the timer configuration information comprises indication information configured to represent a target BWP inactivity timer corresponding to a target BWP, determining the target BWP inactivity timer corresponding to the indication information according to a BWP candidate inactivity timer set configured by the base station for the terminal and the timer configuration information, and using the target BWP inactivity timer on the target BWP, wherein the BWP candidate inactivity timer set comprises at least two BWP candidate inactivity timers configured respectively for BWPs;
wherein the timer configuration information further comprises a binding one-to-one correspondence relationship between the BWPs configured by the base station for the terminal and the at least two BWP candidate inactivity timers; and
wherein different BWP candidate inactivity timer configurations corresponding to different service cells are executed separately.

10. The method of claim 9, wherein the first BWP is any BWP configured by the base station for the terminal, and the timer configuration information comprises a binding relationship between the BWPs configured by the base station for the terminal and the BWP inactivity timers;
using the first BWP inactivity timer on the first BWP according to the timer configuration information comprises:
when switching from a currently activated BWP to a target BWP, determining a target BWP inactivity timer corresponding to the target BWP according to the binding relationship, and using the target BWP inactivity timer on the target BWP.

11. The method of claim 10, wherein the binding relationship comprises a one-to-one correspondence relationship and/or a many-to-one correspondence relationship between the BWPs and the BWP inactivity timers.

12. The method of claim 9,
wherein using the first BWP inactivity timer on the first BWP according to the timer configuration information comprises:
when the timer configuration information comprises the target BWP inactivity timer corresponding to the target BWP, using the target BWP inactivity timer on the target BWP.

13. The method of claim 9, wherein the first BWP is a default BWP and/or an initial BWP configured to implement a BWP automatic rollback function;
receiving the timer configuration information sent by the base station comprises:
receiving a system message or a dedicated signaling configured to bear the timer configuration information sent by the base station, wherein the timer configuration information comprises a first default BWP inactivity timer corresponding to the default BWP, and/or a second default BWP inactivity timer corresponding to the initial BWP;
using the first BWP inactivity timer on the first BWP according to the timer configuration information comprises:
when rolling back from a currently activated BWP to the default BWP, using the first default BWP inactivity timer corresponding to the default BWP on the default BWP; and
when rolling back from a currently activated BWP to the initial BWP, using the second default BWP inactivity timer corresponding to the initial BWP on the initial BWP.

14. The method of claim 9, wherein the first BWP is the target BWP indicated by the base station to the terminal for BWP switch;
receiving the timer configuration information sent by the base station comprises:
receiving a BWP switch command configured to bear the timer configuration information sent by the base station, wherein the timer configuration information comprises the target BWP inactivity timer corresponding to the target BWP, or indication information configured to represent the target BWP inactivity timer corresponding to the target BWP.

15. An apparatus for timer configuration, wherein a base station configures at least one Band Width Part (BWP) for the apparatus, the apparatus comprising:
a processor;
a memory configured to store instructions executable by the processor;
wherein, the processor is configured to:
receive timer configuration information sent by the base station, wherein the timer configuration information is configured to indicate to use a first BWP inactivity timer on a first BWP, and the first BWP inactivity timer is a BWP inactivity timer configured by the base station for the first BWP; and
use the first BWP inactivity timer on the first BWP according to the timer configuration information;
wherein the processor is configured to:

in response to determining that the timer configuration information comprises indication information configured to represent a target BWP inactivity timer corresponding to a target BWP, determine the target BWP inactivity timer corresponding to the indication information according to a BWP candidate inactivity timer set configured by the base station for the terminal and the timer configuration information, and use the target BWP inactivity timer on the target BWP, wherein the BWP candidate inactivity timer set comprises at least two BWP candidate inactivity timers configured respectively for BWPs;

wherein the timer configuration information further comprises a binding one-to-one correspondence relationship between the BWPs configured by the base station for the terminal and the at least two BWP candidate inactivity timers; and wherein different BWP candidate inactivity timer configurations corresponding to different service cells are executed separately.

16. The apparatus of claim 15, wherein the binding relationship comprises a one-to-one correspondence relationship and/or a many-to-one correspondence relationship between the BWPs and the BWP inactivity timers.

17. The apparatus of claim 15,
wherein the processor is further configured to when the timer configuration information comprises the target BWP inactivity timer corresponding to the target BWP, use the target BWP inactivity timer on the target BWP.

18. The apparatus of claim 15, wherein the first BWP is a default BWP and/or an initial BWP configured to implement a BWP automatic rollback function;

the processor is configured to:
receive a system message or a dedicated signaling configured to bear the timer configuration information sent by the base station, wherein the timer configuration information comprises a first default BWP inactivity timer corresponding to the default BWP, and/or a second default BWP inactivity timer corresponding to the initial BWP;

when rolling back from a currently activated BWP to the default BWP, use the first default BWP inactivity timer corresponding to the default BWP on the default BWP; and when rolling back from a currently activated BWP to the initial BWP, use the second default BWP inactivity timer corresponding to the initial BWP on the initial BWP.

19. The apparatus of claim 15, wherein the first BWP is the target BWP indicated by the base station to the terminal for BWP switch;

the processor is configured to:
receive a BWP switch command configured to bear the timer configuration information sent by the base station, wherein the timer configuration information comprises the target BWP inactivity timer corresponding to the target BWP, or indication information configured to represent the target BWP inactivity timer corresponding to the target BWP.

* * * * *